July 9, 1929.  W. B. HARRIS  1,720,271

HARNESS CORD FOR LOOMS

Filed July 13, 1927

Inventor:
Warren B. Harris
By Geo. W. Kennedy
Attorney

Patented July 9, 1929.

1,720,271

UNITED STATES PATENT OFFICE.

WARREN B. HARRIS, OF MILLBURY, MASSACHUSETTS.

HARNESS CORD FOR LOOMS.

Application filed July 13, 1927. Serial No. 205,411.

The invention relates to the flexible connections, called "harness cords", which are used to transmit the motion of the jacks or levers in a shedding mechanism to the harness frames that control the warp threads in a loom. The invention is especially applicable for use in connection with dobbies, although not limited to such, being also susceptible of use in connection with the vibrator gear head motion, or any other type of harness motion.

The invention comprises a flexible braided cord in the center of which is a core of multi-strand wire.

Metal ferrules cap the ends of the cord, and screw eyelets are screwed into the wire core, thus expanding the strands of wire and surrounding cord material against the ferrules. By screwing the eyelets into the braided wire core, the tensile strength of the whole article is very measurably increased, because the wire holds the threads of the screw shank much more firmly than the uncored braided cord heretofore used in the construction of these articles. Obviously also, the cord itself is strengthened, so that breakage of the harness connections from any cause is greatly lessened by my invention.

Breakage of harness cords in a loom is one of the most frequent causes of warp smashes and damaged goods, entailing a great loss of production and lowering the selling price of the cloth. The use of the invention, therefore, results in a marked increase in the daily profit to be made from a given loom.

In the drawings:—

Like reference characters refer to like parts throughout the drawings.

Figure 1:
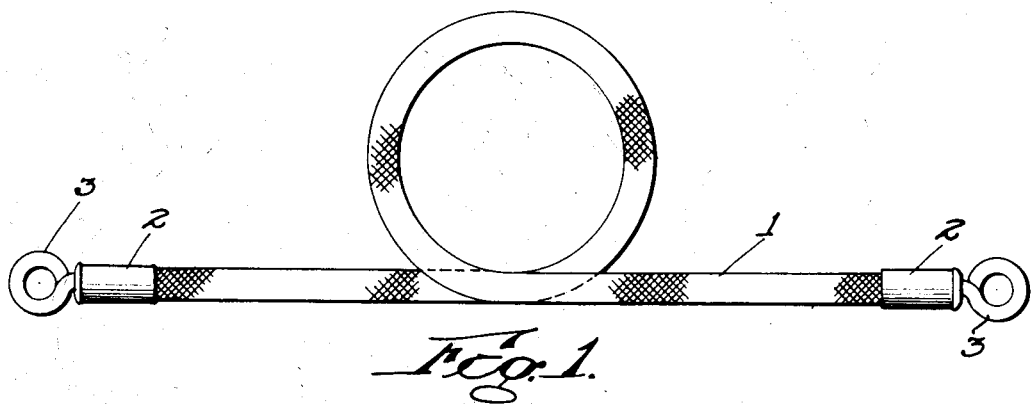
Fig. 1 is a view in elevation of the harness cord of the invention.
Figure 4:
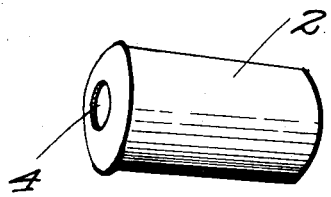
Fig. 4 is a perspective view of a ferrule.

Referring first to Fig. 1, a harness cord comprises a cord portion proper 1, ferrules 2, 2 at each end thereof, and eyelets 3, 3 screwed into the cord through holes 4, 4 in the ends of the ferrules 2, 2. See Fig. 4. It should be understood that my invention is not limited to the use of ferrules and eyelets at both ends of the cord, but contemplates the improved setting of an eyelet or other attaching device even if used only at one end.

Figure 2:
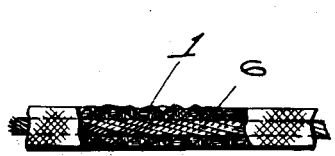
Fig. 2 is a sectional view of a portion of the cord intermediate the ferrules.

Referring now to Fig. 2, the cord 1 has a central portion 6 of multi-strand wire, preferably steel wire. This flexible core of wire 6 greatly increases the strength of the harness cord as a whole, since the tensile pull is taken by it, the surrounding cord 1 being made of braided cotton, or like material, which will stretch to allow the core to support the load.

Figure 5:
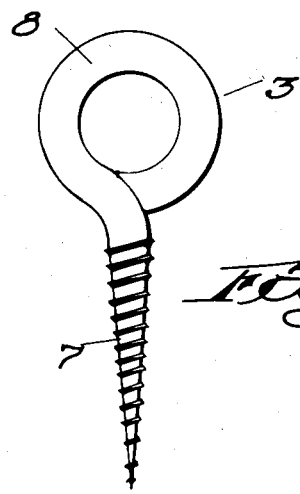
Fig. 5 is a side elevation of an eyelet.

Referring to Fig. 5, the eyelet comprises a screw threaded shank 7 and a looped portion 8. When making the article of the invention, ferrules 2 are forced over the ends of the cord 1, which can be easily done, since the ends of the cord are at that time not expanded. Eyelets 3, 3 are then screwed substantially centrally into the core of wire 6, which is preferably twisted cable, and the shanks 7 spread the separate strands of the wire core and cause them to assume a shape complementary to the screw threads on the shanks 7. At the same time the spreading action causes the outside cord material 1 to press firmly against the ferrules, thus holding them fast onto the cord. Once the strands of the core wire 6 have been spread to receive and hold the shank 7 of the particular screw eye 3 in question, the cord material is so forcibly compressed against the surrounding ferrule 2 that the eyelet cannot be pulled out.

Figure 3:
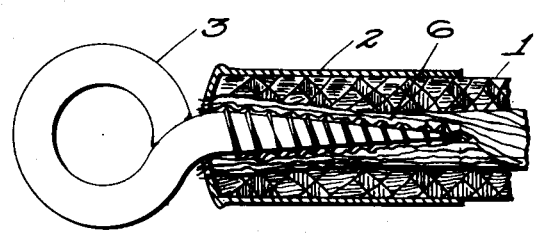
Fig. 3 is an enlarged sectional view through one of the ferrules, showing the shank of an eyelet in engagement with the central wire core.

The way in which the stranded wire holds the shank 7 of an eyelet is best illustrated in Fig. 3. While it is true that according to the prior method of constructing these articles, the cord material also conformed itself to a certain extent to the threads on a screw shank, this conformation was in no wise permanent or unyielding, and the eyelets could be pulled out if excessive strain was exerted on them. But when the strands of wire have been forced into the shape shown in Fig. 3, with a great many small bends therein, a tensile pull on the eyelet, no matter how strong, is not able to return the strands to their original positions, in fact they will break first. Whereas, therefore, in the old type of harness cord, breakage usually occurred from the pulling out of an eyelet, in the case of the article of the present invention, the eyelet connection is just as strong as the cord body, intermediate of its ends. And since the reinforced cord body of the present invention is a great deal stronger than the body of the old cords, the result is that the harness cords of the invention are many times stronger than those that have been in use.

I claim:

1. In a harness cord for looms, multi-strand flexible wire forming a core, a cord of textile material braided about said wire, a ferrule capping one end of said cord and said wire, and a screw device screwed into said multi-strand wire through said ferrule, whereby said screw device is firmly held by the deformation of said wire incident to screwing in said screw device.

2. In a harness cord for looms, multi-strand flexible wire forming a core, a cord of textile material braided about said wire, a ferrule capping one end of said cord and said wire, and a screw device screwed into said multi-strand wire through said ferrule, whereby said multi-strand wire is pressed into an unyielding shape complementary to the threads on said screw device and holds said screw device firmly.

WARREN B. HARRIS.